(12) United States Patent
Simpson (10) Patent No.: US 9,134,453 B1
(45) Date of Patent: Sep. 15, 2015

(54) FORECASTING HYDROCARBON PRODUCTION

(75) Inventor: Erik M. Simpson, Houston, TX (US)

(73) Assignee: Simpson Holdings, Inc., Houston, TX (US)

( * ) Notice: Subject to any disclaimer, the term of this patent is extended or adjusted under 35 U.S.C. 154(b) by 1163 days.

(21) Appl. No.: 13/078,819

(22) Filed: Apr. 1, 2011

(51) Int. Cl.
*G01V 1/40* (2006.01)
*G01V 11/00* (2006.01)

(52) U.S. Cl.
CPC ...................................... *G01V 11/00* (2013.01)

(58) Field of Classification Search
USPC ............................................................ 702/6
See application file for complete search history.

(56) References Cited

U.S. PATENT DOCUMENTS

| | | | |
|---|---|---|---|
| 4,583,170 A * | 4/1986 | Carlin et al. | 702/55 |
| 7,066,010 B2 | 6/2006 | Bryant et al. | |
| 7,369,950 B2 | 5/2008 | Wall et al. | |
| 7,373,221 B2 | 5/2008 | Lal | |
| 7,660,673 B2 * | 2/2010 | Dozier | 702/6 |
| 7,844,568 B2 * | 11/2010 | Fein et al. | 706/62 |

\* cited by examiner

*Primary Examiner* — Aditya Bhat
(74) *Attorney, Agent, or Firm* — Pramudji Law Group PLLC; Ari Pramudji (57) ABSTRACT

A method for forecasting hydrocarbon production of a well. The method includes receiving one or more parameters that describe hydrocarbon properties of the well and receiving an amount of proppants that corresponds to the well. After receiving the parameters and the amount of proppants, the method includes determining a forecast of hydrocarbon production of the well based on the parameters and the amount of proppants.

20 Claims, 4 Drawing Sheets

FORECASTING HYDROCARBON PRODUCTION

BACKGROUND OF THE INVENTION

1. Field of the Invention

Implementations of various technologies described herein generally relate to hydrocarbon production at wells.

2. Description of the Related Art

The following descriptions and examples are not admitted to be prior art by virtue of their inclusion within this section.

When extracting hydrocarbons (e.g., oil, natural gas, etc.) from the earth, wells may be drilled and then fractured to enhance the flow of the hydrocarbons from formations in the earth into the wells. Currently, the hydrocarbon output or production for a basin is determined based on the number of wells that are drilled in the basin. Conventional hydrocarbon production calculation methods incorrectly assume that a well is immediately producing hydrocarbons after it has been drilled and further assume that the production is proportionate to the amount of wells. However, as mentioned above, some drilled wells may only produce hydrocarbons after they have been fractured.

SUMMARY

Described herein are implementations of various technologies a method for determining the hydrocarbon production of a well. In one implementation, the method for determining the hydrocarbon production of a well may include receiving one or more parameters that describe hydrocarbon properties of the well and receiving an amount of proppants that corresponds to the well. After receiving the parameters and the amount of proppants, the method may include determining a forecast of hydrocarbon production of the well based on the parameters and the amount of proppants.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

The following paragraphs provide a brief summary of various techniques described herein. In one implementation, a computer application may receive preliminary information related to a well. The preliminary information may include various rig data, forward drilling estimates, number of wells drilled, time to drill a well, capital expenditures per well and region, technology used to drill the well, initial production rates, decline curves for well production, production statistics, merger and acquisition activity for production statistics and the like.

The computer application may then receive an amount of proppants that has been delivered to the well. In one implementation, the amount of proppants delivered to the well may be determined based on the number of proppant trucks that deliver the proppants to the well. Each proppant truck may include a predetermined amount of proppants stored therein. As such, the computer application may determine the amount of proppant delivered to the well by converting the number of proppant trucks at the well to an amount of proppants at the well.

Based on the amount of proppants at the well, the computer application may determine the number of frac stages that correspond to the well. The number of frac stages at the well may then be combined with the preliminary information to forecast the hydrocarbon production of the well over time. In one implementation, the computer application may determine the number of frac stages at each well in a basin to forecast the hydrocarbon production of each well in the basin over time. The computer application may then combine the expected hydrocarbon production of each well in the basin over time to forecast the overall hydrocarbon production of the basin over time.

One or more implementations of various techniques for determining the hydrocarbon production of a well will now be described in more detail with reference to FIGS. 1-4 in the following paragraphs.

Figure 1:
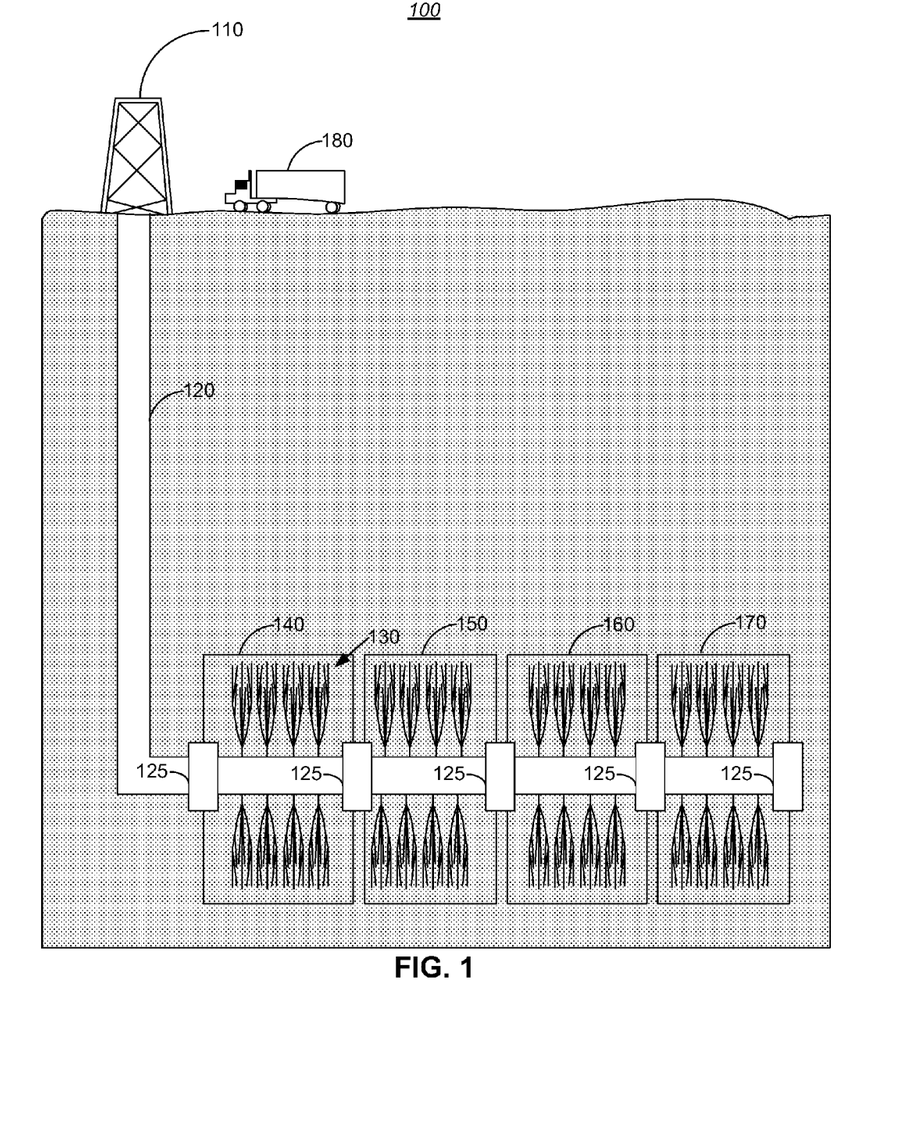
FIG. 1 illustrates a schematic diagram of a well site in accordance with implementations of various techniques described herein.

FIG. 1 illustrates a schematic diagram of well site 100 in accordance with implementations of various techniques described herein. Well site 100 may include rig (or well head) 110, wellbore 120, plugs 125, fractures 130, frac stage 140, frac stage 150, frac stage 160, frac stage 170 and proppant truck 180.

Rig 110 may include a machine used to drill wellbore 120. Major components of rig 110 may include mud tanks, mud pumps, a derrick or mast, drawworks, a rotary table or top-drive, a drillstring, power generation equipment, auxiliary equipment and the like. Although FIG. 1 illustrates an onshore rig, some implementations of various techniques described herein may be used with offshore rigs.

Wellbore 120 may include an openhole portion of the well that may be used to pump hydrocarbons out from the earth. As shown in FIG. 1, wellbore 120 may be drilled vertically and then laterally in the subsurface of the earth. In one implementation, the lateral portion of wellbore 120 may be sectioned off into frac stages using plugs 125. Fracturing fluid may then be pumped into one of the frac stages at a predetermined rate which may cause the pressure inside wellbore 120 to increase. The increase in pressure may cause the area of the earth surrounding wellbore 120 (i.e., formation) to crack. The cracks within the formation may be referred to as fractures 130. After fractures 130 have been created, the fracturing fluid may enter into factures 130 and extend fractures 130 farther into the formation. Proppants mixed in with the fracture fluid may then hold fractures 130 open such that the propped fractures become a high permeability conduit through which the formation fluids (i.e., hydrocarbons) may flow to wellbore 120.

Fractures 130 created between each plug 125 may be referred to as a frac stage. As an example, FIG. 1 illustrates four frac stages for well site 100 (i.e., frac stage 140, frac stage 150, frac stage 160, frac stage 170). In one implementation, the number of frac stages for well site 100 may be used to determine the hydrocarbon production of well site 100.

As mentioned above, proppants may be mixed with fracturing fluid to hold fractures open after a formation has been fractured. Proppants may include naturally occurring sand grains, man-made or specially engineered proppants, such as resin-coated sand or high-strength ceramic materials (e.g., sintered bauxite) and the like. The most common proppants include sieved round sand. Proppants may be delivered to well site 100 by proppant truck 180. Generally, proppant truck 180 is a standard size and is configured to carry a standard amount of proppants. As such, the amount of proppants being used at well site 100 may be based on the number of proppant trucks that deliver proppants to well site 100.

Figure 2:
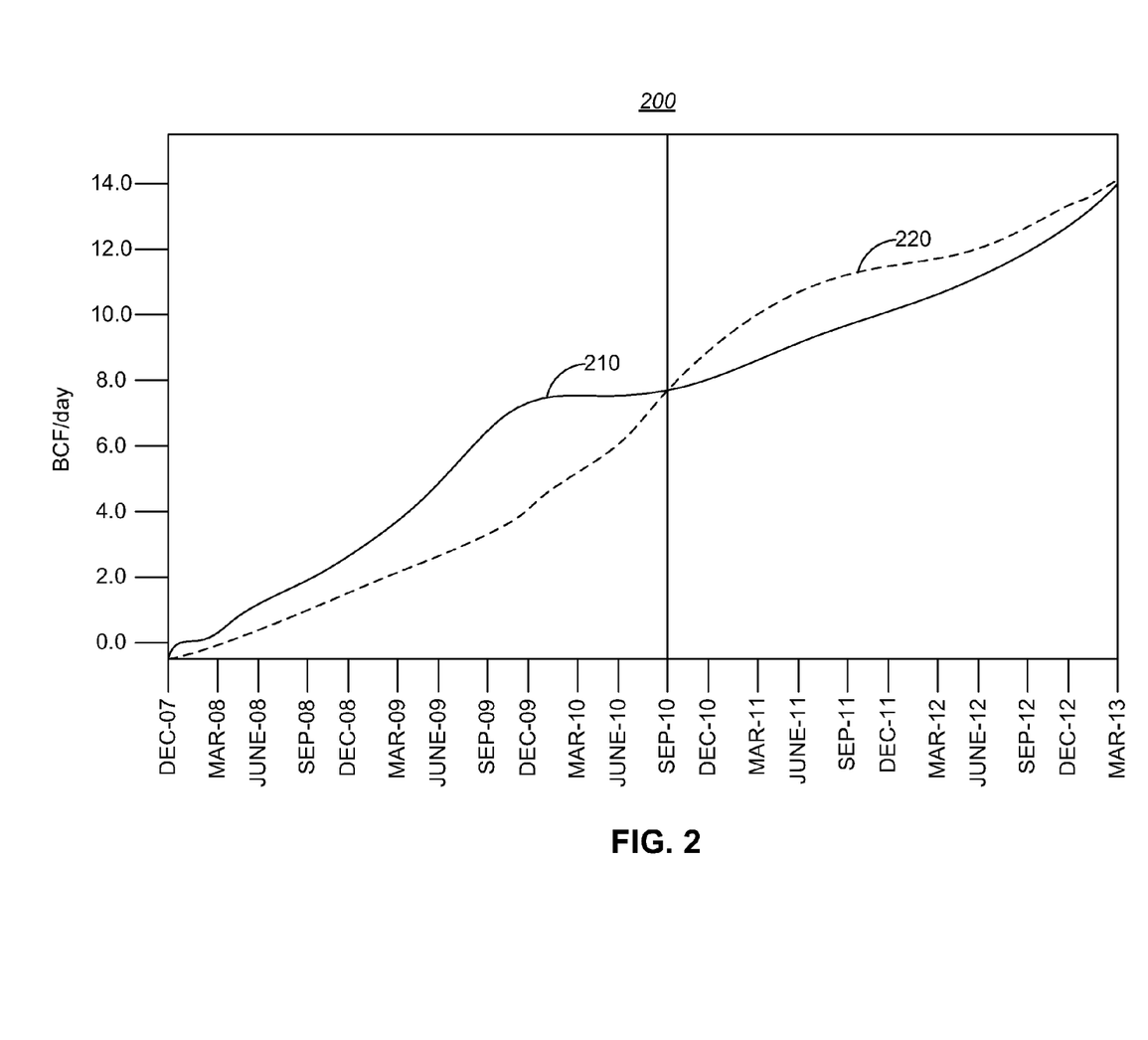
FIG. 2 illustrates a graph of hydrocarbon production of a well over time in accordance with implementations of various techniques described herein.

FIG. 2 illustrates a graph of hydrocarbon production of a well over time in accordance with implementations of various techniques described herein. Currently, a model of hydrocarbon production in a basin is determined based on one or more of the following rig output parameters:

1) Public information available on state databases that indicate the hydrocarbon supply for each basin States such as Louisiana, Texas, Pennsylvania, Colorado, Wyoming, New Mexico, West Virginia, Ohio, California, Missouri, South Dakota, North Dakota, Michigan and Oklahoma make various types of hydrocarbon production information publically available. The various types of hydrocarbon production information may include public natural gas well data for drilled and producing wells with their respective department of natural resource departments. They may also include natural gas drilling data such as the number of drilled but uncompleted wells, the well permits of yet to be drilled wells and current drilling as well as producing wells.

2) Producer press releases

Producer press releases may indicate various rig data, forward drilling estimates, number of wells drilled, times to drill, capital expenditures for each of its wells and/or region. Producer press releases may further indicate the technology used to drill wells, the initial production rates, the decline curves for well production, the production statistics and merger and acquisition activity for production statistics for each of its wells.

3) Information gained from producer/client relationships

Producer relationship information may indicate various rig data, forward drilling estimates, number of wells drilled, time to drill a well, capital expenditures per well and region, technology used to drill wells, initial production rates, decline curves for well production, production statistics and M&A activity for production statistics for each well of privately held producers.

4) Information gained from service company clients/relationships

Service company relationship information may be used to obtain similar information as described above for producer relationship information.

5) Information gained from federal government agencies

The Energy Information Administration and the Department of Energy may provide similar information as provided by states. This information may be used to compare and contrast results by region and aggregated across the United States.

The Federal Energy Regulatory Commission may provide information from most natural gas pipeline companies related to each company's natural gas flow rates.

6) Information gained from decline curves from producers/state databases

Decline curves are derived from a combination of public state databases on a lagged basis. Decline curves may be derived on a real time basis using models of pipeline flow information and estimation formulas relative to formation density and composition.

7) Information gained from drill days from producers, service companies or states Drill days indicate the amount of time that it takes for a rig to drill one well. Drill days are used to determine how productive a single rig may be over a full year and help ascertain forward rig productivity in various production model assumptions. Drill days may be one of the inputs in determining a hydrocarbon supply on a forward basis.

8) Initial production rates from state databases

Initial production rates are derived on a lagged basis from public state database data and on a real time basis using both producer press releases and producer information that provide initial production data for the producer's wells.

9) Well inventory models

Well inventory models are mostly derived from public information pertaining to rigs (i.e., rig information) provided by companies that provide public data sources. The rig information may be combined with drill day calculations as determined by field representatives in the supply basin. The combination of the rig information and the drill day calculations may result in a forward rig productivity value. The amount of wells that are being completed may then be subtracted from the forward rig productivity value to determine the well inventory model.

10) Mathematical models that compare producer numbers with well completions to overall production The mathematical models forecasting production are based on measuring the completion rate of well fracture.

11) Rig models independent from pipeline or completion constraint supply models

Pipeline and completion constraint models may describe if a new pipeline project will be completed as scheduled and if the hydrocarbon supply will be able to flow on a pipeline as scheduled. The pipeline and completion constraint models may be used to more accurately determine the production in a region in view of the delays with respect to pipeline projects.

Using the aforementioned data sources, the model of hydrocarbon production at a well may be determined by solving a series of mathematical equations and formulas. Although conventional rig models may be used to determine the model of hydrocarbon production at a well, conventional rig models do not accurately represent the actual hydrocarbon production being produced at the well because the mathematical equations do not account for the real time rate of completion at the well. These mathematical equations lack information detailing how many frac stages are present at the well. By omitting the number of frac stages from its calculations, the conventional rig models assume that every well that has been drilled is producing hydrocarbons. However, the hydrocarbon production of a well is largely dependent on whether the well has been fractured and how many frac stages are contained within the well. Since wells are typically drilled faster than they are fractured, the fact that a well has been drilled does not mean that the well is producing hydrocarbons. By assuming that drilled wells are producing hydrocarbons, conventional rig models overestimate the hydrocarbon production of a well and the hydrocarbon production of a basin. The difference between the actual hydrocarbon production of a well and the conventional rig model's estimate of the hydrocarbon production of the well is referred to as an inventory of hydrocarbons. The inventory of hydrocarbons creates an inaccurate analysis of natural gas supply and demand trends, which may result in lost profits and the like.

Curve 210 in FIG. 2 illustrates an estimate of hydrocarbon production values over time for a well based on a conventional model of hydrocarbon production determined using the data sources mentioned above. Since the conventional hydrocarbon production calculation methods do not account for whether a drilled well has been fractured in its calculations, the estimate of hydrocarbon production values over time for a well (i.e., curve 210) does not accurately reflect the actual rate of hydrocarbon production for the well.

Curve 220 in FIG. 2 illustrates the actual hydrocarbon production values over time for the same well. As seen in curves 210 and 220, an inventory of hydrocarbon builds up until approximately September 2010. In September 2010, the well may reach a frac stage such that the built-up inventory may begin to be produced. Method 300 described below may be used to predict the hydrocarbon production that more accurately indicates the actual hydrocarbon production illustrated by curve 220.

Figure 3:
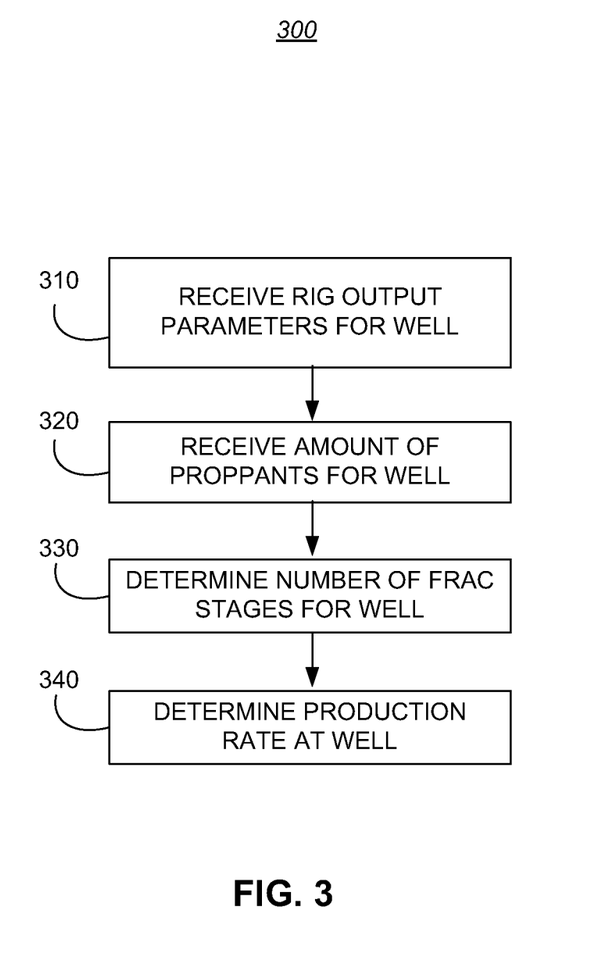
FIG. 3 illustrates a flow diagram of a method for determining the hydrocarbon production of a well in accordance with implementations of various techniques described herein.

FIG. 3 illustrates a flow diagram of method 300 for determining the hydrocarbon production of a well in accordance with implementations of various techniques described herein. In one implementation, method 300 may be performed by a computer application. It should be understood that while method 300 indicates a particular order of execution of operations, in some implementations, certain portions of the operations might be executed in a different order.

At step 310, the computer application may receive rig output parameters for a well. In one implementation, the rig output parameters received at step 310 may correspond to the rig output parameters listed above with reference to FIG. 2. The computer application may index each category of the rig output parameters in a database so that all of the data may be managed and viewed using various applications. By indexing each category of the rig output parameters in a database, the computer application may be capable of analyzing aggregate characteristics of the rig output parameters. Further, since the rig output parameters are better organized in the database, the computer application may be able to analyze various aspects of the rig output parameters in greater detail. For instance, the computer application may use the database to properly index the supply output of a particular rig with respect to the overall supply output in a basin. In one implementation, each category may be indexed in a database to utilize in estimates of future supply that are corroborated with data regarding the speed of fracturing of uncompleted wells which influences natural gas supply.

In one implementation, the natural gas flow rates acquired from the Federal Energy Regulatory Commission or the Department of Energy may be collected and indexed as an additional source of data for comparison against calculated estimates of hydrocarbon supply and demand, the government estimates of supply and demand, and the public company press releases of supply and demand statistics of natural gas.

At step 320, the computer application may receive an amount of proppants that may be used at the well. In one implementation, the amount of proppants being used at each well may be determined based on the number of proppant trucks that deliver proppants to the well. As mentioned above, each truck delivering proppants may be a standard size and carries a standard amount of proppants. As such, the number of proppant trucks at the well may be directly proportional to the amount of proppants being used at the well.

At step 330, the computer application may determine the number of frac stages that correspond to the well. The number of frac stages that correspond to the well may be directly proportional to the amount of proppants being used at a well (received at step 320). An example of an approximate ratio formula for proppants per frac stage in a particular region is illustrated in the equation below.

$$y = (-7 \times 10^{-15})(x^2) + (2 \times 10^{-6})(x) + 1.9633$$

y is the number of frac stages and x is the amount of proppant in pounds. The ratio formula varies according to the region in which the well resides and the shale formation characteristics in the subsurface of the well. Some parameters which cause variations in the ratio formula may include porosity and permeability characteristics of the subsurface of the earth in which the well resides. Porosity measures how much of a rock is open space relative to the hydrocarbon in place, and permeability measures the ease with which fluid can move through porous rock Table 1, below, illustrates the relationship between the amount of proppants and the number of frac stages in the particular region. The water gallons column indicates the amount of water that may be combined with the proppants when fracturing wellbore 120. The lateral length column indicates the length of the lateral portion of wellbore 120. The proppants per stage column indicates the amount of proppants (lbs.) that are used for each frac stage in wellbore 120

TABLE 1

Fracture Length and stage formula for Proppant and Water

| Proppant lbs. | Water Gallons | Fracture Stages | Lateral Length | Proppant per stage |
|---|---|---|---|---|
| 923,000 | 226,000 | 3 | 1,796 | 307,667 |
| 2,750,000 | 2,646,000 | 7 | 2,200 | 392,857 |
| 3,420,000 | 3,127,000 | 8 | 2,500 | 427,500 |
| 3,250,000 | 3,227,000 | 8 | 2,515 | 406,250 |

At step 340, the computer application may determine the hydrocarbon production rate for the well over time. The computer application may use the number of frac stages that correspond to the well along with the information received at step 310 to determine a per day production of hydrocarbons (e.g., number of billion cubic feet of natural gas per day). The number of frac stages of the well may be directly proportional to initial production rate of the well.

In one implementation, the computer application uses the number of frac stages of the well and the information received at step 310 in a series of mathematical equations and formulas to determine the hydrocarbon production for the well over time. As mentioned above, the number of frac stages may be proportional to the initial production rate of a well. For example, a well with 10 fracture stages is 30% more productive initially than a well with 5 fracture stages. The relationship between the number of frac stages and the initial production rate of the well may be used to determine the hydrocarbon production for the well over time.

In another implementation, at step 330, the computer application may determine the rate at which a well is being fracked in addition to the number of frac stages that correspond to the well. The rate at which the well is being fracked may be determined using the amount of proppants being delivered to the well and the times at which the proppants were delivered. For instance, the computer application may receive information indicating when each proppant truck delivered proppants to the well. The computer application may then determine the number of proppant trucks that delivered proppants to the well over a predetermined period of time (e.g., predetermined number of days, weeks, months, etc.). Based on the number of proppant trucks that delivered proppants to the well over the predetermined period of time, the computer application may determine the total amount of proppants that have been delivered to the well over the predetermined amount of time. Using the total amount of proppants that have been delivered to the well over the predetermined amount of time and the approximate ratio formula described above, the computer application may determine the number of frac stages that may have been achieved in the well over the predetermined amount of time. The number of frac stages that may have been achieved in the well over the predetermined amount of time may correspond to the rate at which the well is being fractured.

After determining the rate at which the well is being fracked, at step 340, the computer application may determine the hydrocarbon production rate for the well over time based on the number of frac stages of the well, the rate at which the well is being fractured and the information received at step 310. The computer application then uses all of this information in a series of mathematical equations and formulas to determine the hydrocarbon production for the well over time. For instance, the rate at which the well is being fractured may be used to measure how productive a frac crew may be in fracturing a well over the course of a year. The productivity of the frac crew may then be combined with the relationship between the number of frac stages and the initial production rate of the well described above to determine the hydrocarbon production for the well over time.

In one implementation, method 300 may be repeated for each well in a basin to forecast the hydrocarbon production for the basin. Additionally, the computer application may use the forecasted hydrocarbon production rate for the basin in addition to information gathered from each major natural gas production basin in the U.S. to calculate an average initial production rate for the wells in the basin. For instance, the average initial production rates for the wells in the basin may be calculated by averaging the state production data for all of the wells in a basin with the hydrocarbon production for the well over time determined at step 340. In newer basins where lagged production data may not exist, the computer application may derive production data (e.g., initial production rate) of well samples received from producers or from public press announcements. The computer application may then multiply the initial production rate by the well count to determine the hydrocarbon productivity of a basin. The average initial production rates may then be used to determine an incremental supply of hydrocarbons that may be coming online to a U.S. pipeline system prior to the hydrocarbon production actually reaching the pipeline system.

In one implementation, method 300 may be used to determine the regional natural gas supply model for each region in the U.S. The regional natural gas supply model for each region in the U.S. may then be added together to calculate total US natural gas supply.

In another implementation, method 300 may be used to determine the supply outputs in context of other supplies such as Liquefied Natural Gas (LNG) and Canadian production.

In yet another implementation, the supply outputs determined using method 300 may be as inputs in various demand equations for power consumption of natural gas, industrial consumption of natural gas, residential consumption of natural gas and pipeline and processing plant consumption of natural gas.

In yet another implementation, the supply outputs determined using method 300 and various demand equations may be used to determine a supply and demand model for the physical commodity of natural gas. The supply and demand model for the physical commodity of natural gas may then be used to estimate imbalances in the supply and demand of the physical commodity of natural gas that may impact the price of natural gas.

Ultimately, the analysis described above may provide hedging and trading investment recommendations and analysis of natural gas supply and demand trends.

Figure 4:
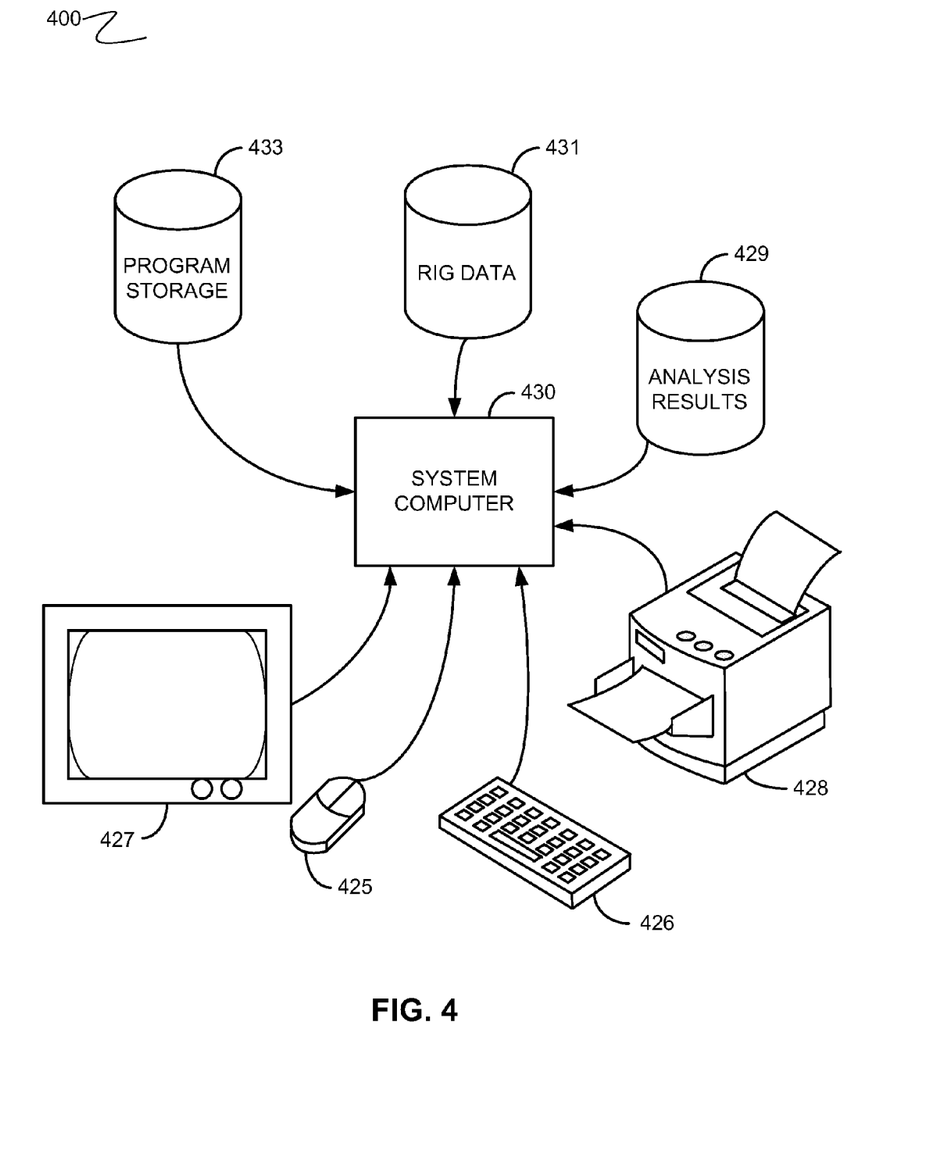
FIG. 4 illustrates a computer network into which various embodiments of the invention may be implemented.

FIG. 4 illustrates computer network 400 into which various embodiments of the invention may be implemented. The computer network 400 includes a system computer 430, which may be implemented as any conventional personal computer or workstation, such as a UNIX-based workstation. The system computer 430 is in communication with disk storage devices 429, 431, and 433, which may be external hard disk storage devices. It is contemplated that disk storage devices 429, 431, and 433 are conventional hard disk drives, and as such, will be implemented by way of a local area network or by remote access. Of course, while disk storage devices 429, 431, and 433 are illustrated as separate devices, a single disk storage device may be used to store any and all of the program instructions, measurement data, and results as desired.

In one embodiment, rig output parameters are stored in disk storage device 431. The system computer 430 may retrieve the appropriate data from the disk storage device 431 to determine the hydrocarbon production of a well according to program instructions that correspond to the methods described herein. The program instructions may be written in a computer programming language, such as C++, Java and the like. The program instructions may be stored in a computer-readable memory, such as program disk storage device 433. Of course, the memory medium storing the program instructions may be of any conventional type used for the storage of computer programs, including hard disk drives, floppy disks, CD-ROMs and other optical media, magnetic tape, and the like.

According to the preferred embodiment of the invention, the system computer 430 presents output primarily onto graphics display 427, or alternatively via printer 428. The system computer 430 may store the results of the methods described above on disk storage 429, for later use and further analysis. The keyboard 426 and the pointing device (e.g., a mouse, trackball, or the like) 425 may be provided with the system computer 430 to enable interactive operation.

While FIG. 4 illustrates the disk storage 431 as directly connected to the system computer 430, it is also contemplated that the disk storage device 431 may be accessible through a local area network or by remote access. Furthermore, while disk storage devices 429, 431 are illustrated as separate devices for storing input seismic data and analysis results, the disk storage devices 429, 431 may be implemented within a single disk drive (either together with or separately from program disk storage device 433), or in any other conventional manner as will be fully understood by one of skill in the art having reference to this specification.

While the foregoing is directed to embodiments of the present invention, other and further embodiments of the invention may be devised without departing from the basic scope thereof, and the scope thereof is determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for determining hydrocarbon production of a well, comprising:
   (a) receiving one or more parameters that describe hydrocarbon properties of the well during a predetermined period of time, wherein the one or more parameters comprise:
      public information available on one or more state databases that indicate a hydrocarbon supply for a basin corresponding to the well;
      producer press release information regarding the basin;
      producer relationship information regarding the basin; and
      service company relationship information regarding the basin;
   (b) determining a number of proppant trucks delivering proppants to the well over the predetermined period of time;
   (c) determining an amount of proppants that corresponds to the well based on the number of proppant trucks; and
   (d) determining, using a microprocessor, a hydrocarbon production model based on the parameters and the amount of proppants.

2. The method of claim 1, wherein the producer press release information, the producer relationship information and the service company relationship information comprise one or more forward drilling estimates for each well in the basin, a number of wells drilled in the basin, times to drill each well, capital expenditures for each of well, a technology used to drill each well, one or more initial production rates for each well, one or more decline curves for each well, production statistics for each well and merger and acquisition activity for the production statistics for each well, or combinations thereof.

3. The method of claim 1, further comprising indexing the parameters in a database.

4. The method of claim 1, wherein each proppant truck stores a predetermined amount of proppants.

5. The method of claim 1, wherein determining the hydrocarbon production model comprises:
   determining a number of frac stages for the well based on the amount of proppants; and
   determining the hydrocarbon production model based on the parameters and the number of frac stages.

6. The method of claim 5, wherein the number of frac stages is proportional to the amount of proppants.

7. The method of claim 6, wherein the proportionality of the number of frac stages and the amount of proppants is based on porosity and permeability characteristics of a subterranean area of the well.

8. The method of claim 1, further comprising repeating steps (a)-(d) for each well in a basin to determine a hydrocarbon production of the basin.

9. The method of claim 1, wherein determining the hydrocarbon production model comprises:
   determining a number of frac stages for the well based on the amount of proppants;
   determining a rate at which the well is being fracked based on the amount of proppants and one or more times at which the amount of proppants are delivered to the well; and
   determining the hydrocarbon production model based on the parameters, the number of frac stages and the rate at which the well is being fracked.

10. The method of claim 1, wherein the hydrocarbon production model comprises a hydrocarbon production model of the well, a regional natural gas supply model, a supply and demand model for natural gas, or combinations thereof.

11. A computer system, comprising:
    a processor; and
    a memory comprising program instructions executable by the processor to:
       (a) receive one or more parameters that describe hydrocarbon properties of a well;
       (b) determine a number of proppant trucks delivering proppants to the well;
       (c) determine an amount of proppants that corresponds to the well based on the number of proppant trucks;
       (d) determine a number of frac stages for the well based on the amount of proppants; and
       (e) determine a hydrocarbon production model based on the parameters and the number of frac stages.

12. The computer system of claim 11, wherein each proppant truck stores a predetermined amount of proppants.

13. The computer system of claim 11, wherein the number of frac stages is proportional to the amount of proppants.

14. The computer system of claim 11, wherein the program instructions executable by the processor to determine the hydrocarbon production model comprises program instructions to:
    determine a rate at which the well is being fracked based on the amount of proppants and one or more times at which the amount of proppants are delivered to the well; and
    determine the hydrocarbon production model based on the parameters, the number of frac stages and the rate at which the well is being fracked.

15. The computer system of claim 11, wherein the program instructions executable by the processor further comprise program instructions to repeat steps (a)-(e) for each well in a basin to determine a hydrocarbon production of the basin.

16. The computer system of claim 11, wherein the hydrocarbon production model comprises a hydrocarbon production model of the well, a regional natural gas supply model, a supply and demand model for natural gas, or combinations thereof.

17. A non-transitory computer-readable storage medium having stored thereon computer-executable instructions which, when executed by a computer, cause the computer to:
    receive one or more parameters that describe hydrocarbon properties of a well;
    determine a number of proppant trucks delivering proppants to the well;
    determine an amount of proppants that corresponds to the well based on the number of proppant trucks;
    determine a number of frac stages for the well based on the amount of proppants;
    determine a rate at which the well is being fracked based on the amount of proppants and one or more times at which the amount of proppants are delivered to the well; and determine a hydrocarbon production model based on the parameters, the number of frac stages, and the rate at which the well is being fracked.

18. The non-transitory computer-readable storage medium of claim 17, wherein the computer-executable instructions cause the computer to index the parameters in a database.

19. The non-transitory computer-readable storage medium of claim 17, wherein each proppant truck stores a predetermined amount of proppants.

20. The non-transitory computer-readable storage medium of claim 17, wherein the hydrocarbon production model comprises a hydrocarbon production model of the well, a regional natural gas supply model, a supply and demand model for natural gas, or combinations thereof.

* * * * *